(12) United States Patent
Lu et al.

(10) Patent No.: US 7,161,978 B2
(45) Date of Patent: Jan. 9, 2007

(54) TRANSMIT AND RECEIVE WINDOW SYNCHRONIZATION

(75) Inventors: Xiaolin Lu, Plano, TX (US); Ping Tao, Houston, TX (US); Michael O. Polley, Garland, TX (US)

(73) Assignee: Texas Instruments Incorporated, Dallas, TX (US)

( * ) Notice: Subject to any disclaimer, the term of this patent is extended or adjusted under 35 U.S.C. 154(b) by 907 days.

(21) Appl. No.: 10/038,784

(22) Filed: Dec. 31, 2001

(65) Prior Publication Data

US 2003/0081664 A1   May 1, 2003

Related U.S. Application Data

(60) Provisional application No. 60/315,817, filed on Aug. 29, 2001.

(51) Int. Cl.
*H04B 1/38* (2006.01)

(52) U.S. Cl. ...................................... 375/219
(58) Field of Classification Search ................ 375/219, 375/220, 222, 377; 370/395.1, 395.3, 395.4
See application file for complete search history.

(56) References Cited

U.S. PATENT DOCUMENTS

| | | | | |
|---|---|---|---|---|
| 6,034,962 A | * | 3/2000 | Ohno et al. | 370/399 |
| 6,275,471 B1 | * | 8/2001 | Bushmitch et al. | 370/248 |
| 6,278,691 B1 | * | 8/2001 | Ohyama et al. | 370/235 |
| 6,668,170 B1 | * | 12/2003 | Costa et al. | 455/439 |
| 6,697,983 B1 | * | 2/2004 | Chintada et al. | 714/748 |
| 6,765,870 B1 | * | 7/2004 | Chintada et al. | 370/230 |
| 6,785,241 B1 | * | 8/2004 | Lu et al. | 370/241 |
| 2002/0015408 A1 | * | 2/2002 | Rosier et al. | 370/392 |

* cited by examiner

*Primary Examiner*—Young T. Tse
(74) *Attorney, Agent, or Firm*—Steven A. Shaw; W. James Brady; Frederick J. Teleck, Jr.

(57) ABSTRACT

A system for synchronizing sender sliding windows and receiver sliding windows employed in wireless packet communication is provided. The sender sliding window buffers outgoing packets to be sent to a receiver that employs a receiver sliding window to buffer incoming packets. A sender window manager manages the sender sliding window through positive acknowledgement, negative acknowledgement and/or timeout processing to facilitate synchronizing the sender sliding window with the receiver sliding window without employing synchronization messages or master/slave control. Similarly, a receiver window manager manages the receiver sliding window through sequence number analysis to facilitate synchronizing the receiver sliding window with the sender sliding window without employing synchronization messages or master/slave control.

14 Claims, 7 Drawing Sheets

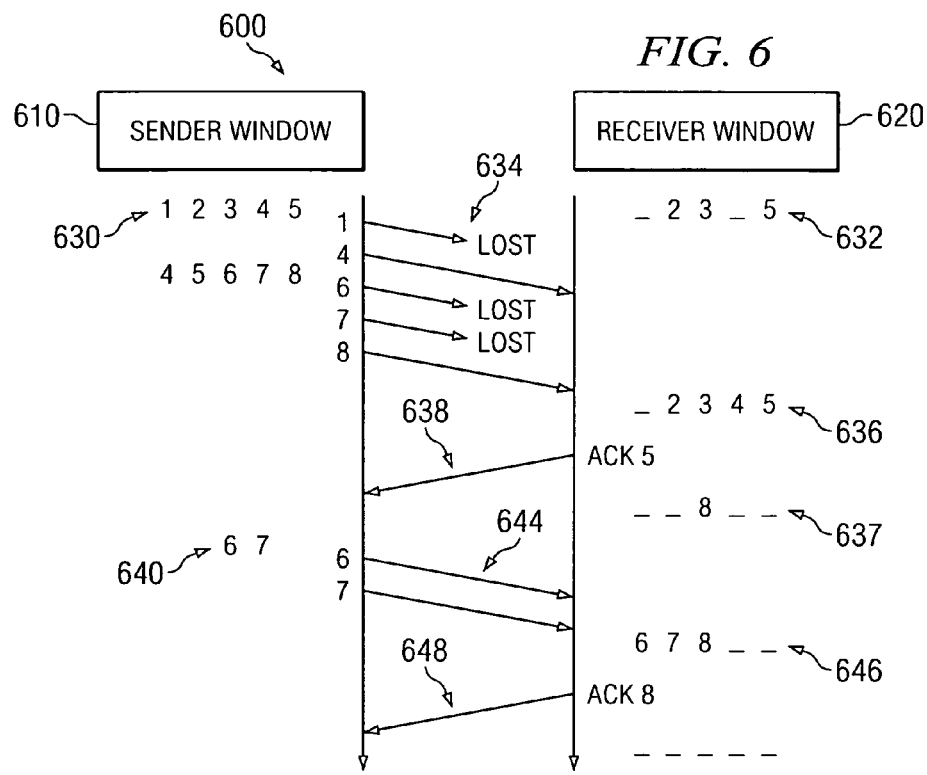
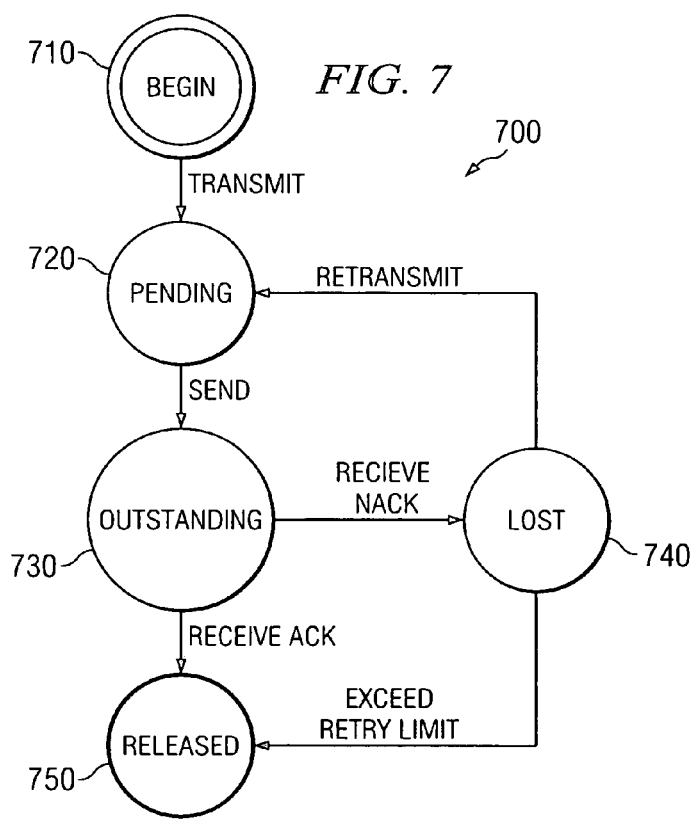

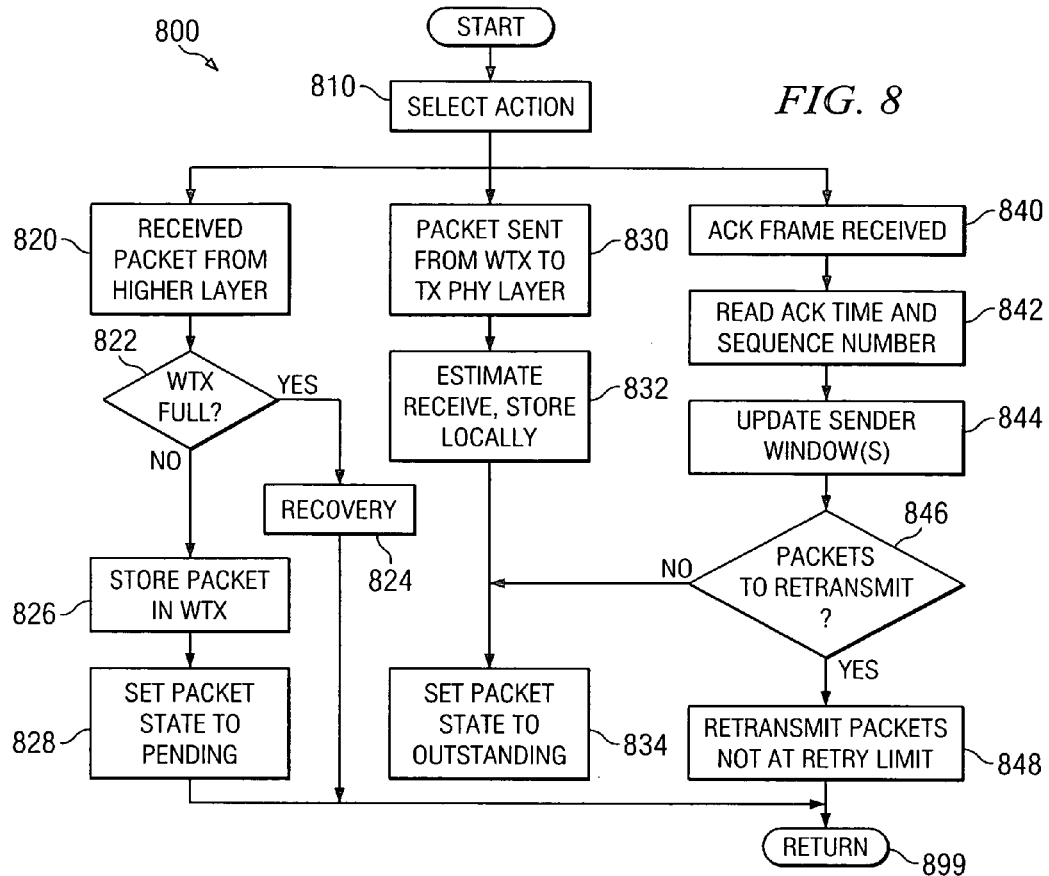
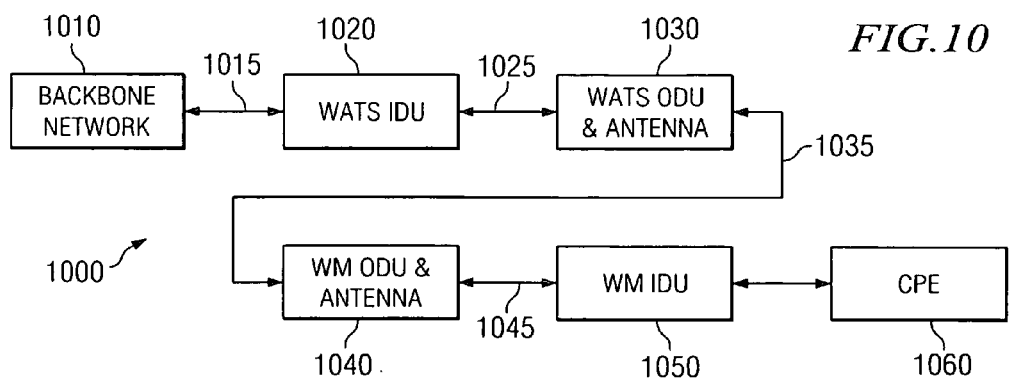

TRANSMIT AND RECEIVE WINDOW SYNCHRONIZATION

CROSS REFERENCE TO RELATED APPLICATIONS

The present application claims the benefit of U.S. Provisional Patent Application Ser. No. 60/315,817, filed Aug. 29, 2001, entitled BROADBAND WIRELESS MEDIA ACCESS CONTROLLER, and which is incorporated herein by reference.

TECHNICAL FIELD

The present invention relates generally to packet flow control and relates more particularly to multi-sided synchronization of transmit and receive windows employed in packet-based communications.

BACKGROUND OF INVENTION

In packet based wired and wireless communication systems packets can be lost during packet transmission. Thus, in a wireless packet based communication environment, packets can be lost. Therefore, packet senders and packet receivers can buffer transmitted and received packets to facilitate efficient interaction with communication protocol stack layers involved in delivering packets. By way of illustration, the well-known TCP/IP protocol employs a master/slave sender and receiver window synchronization system wherein one side of a communication acts as the master and controls the synchronization of windows.

Conventionally a sender has a transmit window in which packets that have been sent to a receiver but not acknowledged are buffered. Such packets include sequence numbers that facilitate in sequence communication with other protocol stack layers. Thus, if a retransmission is required, the packet can be retransmitted from the buffer, rather than requiring communication with the protocol stack layer that generated the packet. Furthermore, the sequence numbers and sender window facilitate abandoning a packet after a pre-determined, configurable number of retransmission attempts.

Similarly, a receiver has a window to buffer packets with sequence numbers that have been received to facilitate delivering packets in sequence to another protocol stack layer. If a packet is not received correctly, then packets that were received correctly and which would be out of sequence if delivered to a subsequent protocol stack layer can be buffered until such time as the packet is received correctly and the sequence can be maintained. In such a conventional system, one side of the communication typically acts as a master, and the other as a slave. The master transmits synchronization messages ("sync" messages) that inform the slave of the proper position for its buffer. This traditional system leads to too many packets being buffered, additional overhead (e.g., sync messages), and latency problems.

SUMMARY OF INVENTION

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to the more detailed description that is presented later.

The present invention concerns a system where a sender (TX) and a receiver (RX) each have sliding windows associated with packet buffers. The present invention facilitates multi-sided TX/RX window synchronization. Either the TX or the RX can take an active role in updating a sliding window associated with the other party to the communication. One example system can be configured for one hundred percent reliability and in-order delivery, thus the TX can retry substantially infinitely to retransmit packets. Another example system can be configured for less than one hundred percent reliability and in-order delivery, thus the TX can retry a pre-determined, configurable number of times to retransmit packets.

In the present invention, the RX can signal to the TX that it can move its sliding window through an acknowledgment (ACK) message. When the TX receives an ACK for a packet that it has buffered, the TX and the RX can release the packet since the RX is acknowledging that it has received the packet. The TX can signal to the RX to move its sliding window through the delivery of an apparently out of sequence packet and/or a message indicating that the TX is not going to attempt to retransmit a packet anymore and that the RX should move its window to accommodate the new packets that the TX is transmitting. The TX and the RX are operative to immediately release packets that have been received in sequence and positively acknowledged by the RX. In one example of the present invention, the TX and the RX negotiate the size of the sliding windows and the relationship between the TX sliding window size and the RX sliding window size.

The present invention can be employed in the wireless data transmission field, and thus, in one example of the present invention, a wireless access termination service (WATS) can serve as a TX and a wireless modem (WM) can serve as a RX. In another example of the present invention, components upstream of a WATS can serve as a TX and components downstream of a WM can serve as a RX. Thus, multiple service identifiers (SIDs) can be employed with the present invention. Thus, for each SID, the TX and RX window can be negotiated during service establishment processes.

To the accomplishment of the foregoing and related ends, certain illustrative aspects of the invention are described herein in connection with the following description and the annexed drawings. These aspects are indicative, however, of but a few of the various ways in which the principles of the invention may be employed and the present invention is intended to include all such aspects and their equivalents. Other advantages and novel features of the invention may become apparent from the following detailed description of the invention when considered in conjunction with the drawings.

BRIEF DESCRIPTION OF THE DRAWINGS

FIG. 6 illustrates a sample packet flow, in accordance with an aspect of the present invention.

FIG. 7 is a state diagram illustrating states associated with transmitting a packet, in accordance with an aspect of the present invention.

FIG. 8 is a flow chart of a packet transmission algorithm, in accordance with an aspect of the present invention.

FIG. 10 is a block diagram of an environment in which the present invention may be employed.

DETAILED DESCRIPTION OF THE INVENTION

The present invention relates to systems and methods for synchronizing sliding windows associated with packet buffers of a sender and a receiver. Both the sender and receiver can take an active role in advancing the transmit and receive windows. For example, the transmit window can shift the window when some packets have reached retransmission limits, while the receive window can chose to move forward when some packets have been buffered for too long a time period.

In the following description, for purposes of explanation, numerous examples are set forth in order to provide a thorough understanding of the present invention. It may be evident, however, that the present invention may be practiced in other examples not set forth in the following description. In other instances, structures and devices are shown in block diagram form in order to facilitate describing various aspects of the present invention.

Figure 1:
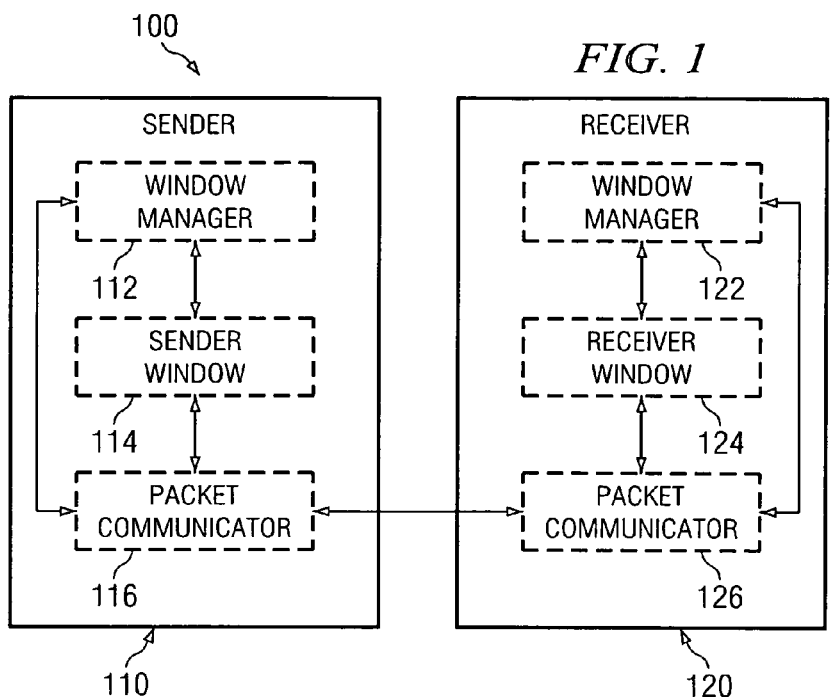
FIG. 1 illustrates a system for synchronizing sender and receiver buffer windows, in accordance with an aspect of the present invention.

FIG. 1 illustrates a system 100 for synchronizing data structures employed in packet transmission between a sender 110 and a receiver 120. The system 100 includes a sender 110 that includes a window manager 112, a sender window 114 and a packet communicator 116. The system 100 also includes a receiver 120 that includes a window manager 122, a receiver window 124 and a packet communicator 126. The packet communicators 116 and 126 can be any of a variety of packet communicator types.

The sender window 114 and the sender window manager 112 selectively receive packets from a higher layer in a protocol stack. Such packets have a sequence number. The sender window 114 buffers the packets to send to the receiver 120 so that, for example, if a packet is lost then retransmission can be performed efficiently without requesting the packet from the higher protocol stack layer. Once an acknowledgement for a packet sent to the receiver 120 has been received, the window manager 112 and/or the sender window 114 can remove the packet from the sender window 114 to make room for additional packets to send to the receiver 120. Such removal can be physical (e.g., clearing memory) and/or logical (e.g., updating pointers, moving limits). In some instances, the window manager 112 and/or the sender window 114 can determine that a packet has been transmitted to the receiver 120 more than a pre-determined, configurable number of times and that the packet should therefore be removed from the sender window 114.

The window manager 112 manages the sender window 114 to facilitate synchronizing the sender window 114 with the receiver window 124 so that smaller buffers can be maintained. Thus, in one example of the system 100, the size of the sender window 114 and the size of the receiver window 124 are negotiated during service establishment.

Since the sender 110 and the receiver 120 will be processing packets with sequence numbers, a range of sequence numbers for packets that the sender window 114 is buffering can be established with an upper limit and a lower limit. Similarly, a range of sequence numbers for packets that the receiver window 124 is expecting can be established with an upper limit and a lower limit. Such limits can be employed in a sliding window data structure, for example.

In one example of the system 100, the sender 110 and the receiver 120 are components in a wireless packet communication system. Thus, a packet can be transmitted, for example through a sender 110 associated with a WATS to a receiver 120 associated with a WM. Such a packet can carry a sequence number. Based on the sequence number, the receiver window manager 122 can determine to move the receiver window 124. For example, if the sequence number of a correctly received packet indicates that a packet for which the receiver 120 was waiting will not be delivered (e.g., retry limit exceeded at sender 110), then the receiver window manager 122 may adjust the upper and/or lower limit of the receiver window 124 so that the receiver 120 is no longer waiting for the packet that will not be delivered. Once the receiver window manager 122 determines that one or more packets have been correctly received in order, the window manager 122 can deliver such in order packets to a higher protocol stack layer, acknowledge the correctly received packets, remove the packets from the receiver window 124 and move the receiver window 124. Removing the packets can be physical (e.g., clearing memory) and/or logical (e.g., moving pointers).

The receiver 120 can also affect the sender window 114. The receiver 120 can generate an acknowledgment to a packet that was transmitted, for example, from a sender 110 through a WM to a receiver 120 through a WATS. Based on the acknowledgement, the send window manager 112 selectively moves the sender window 114. For example, if the sender window 114 is buffering a packet that has been transmitted to the receiver 120 for which an acknowledgement is received, then the send window manager 112 can remove the packet from the window 114 and adjust the upper and/or lower limit of sequence numbers being stored in the sender window 114.

Figure 2:
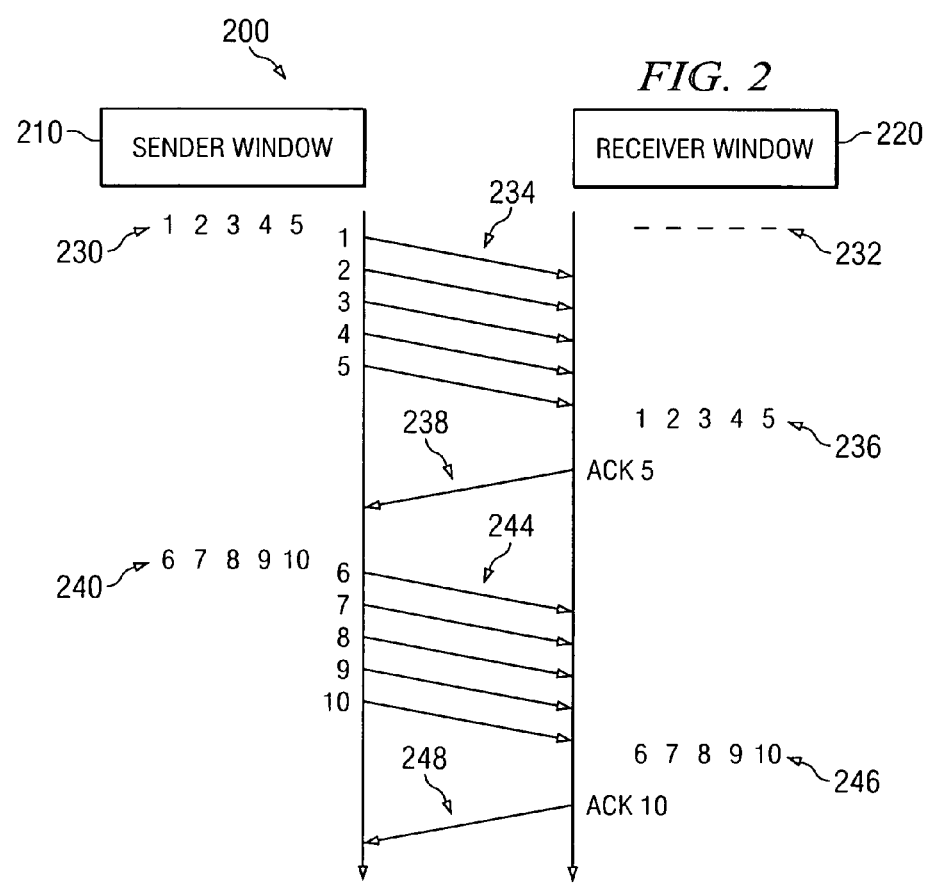
FIG. 2 illustrates a sample packet flow, in accordance with an aspect of the present invention.

FIGS. 2 through 6 are sample packet and acknowledgement flows that illustrate how a sender and a receiver can both participate in synchronizing a sender sliding window transmit buffer and receiver sliding window receive buffer. The left side of FIG. 2 illustrates packets that flow through a sender window 210 while the right side of FIG. 2 illustrates packets that flow through a receiver window 220. The center of FIG. 2 illustrates a flow 200 of packets from a sender to a receiver and a flow of acknowledgements from a receiver to a sender.

In FIG. 2, assume initially that the receiver window 220 is empty, as illustrated at 232. Assume also that at 230 the sender window 210 initially receives packets 1 through 5 to transmit to the receiver. Assume that all five packets are correctly delivered, thus, at 234, the packets are transmitted to the receiver and at 236 the receiver window 220 buffers the packets. Since the five packets were correctly received and can be delivered in order to a higher protocol stack layer at the receiver, an acknowledgement (e.g., ACK 5) can be sent from the receiver to the sender indicating that packets with sequence numbers up to sequence number 5 have been received correctly in order. Therefore, at 238, such acknowledgement is transmitted from the receiver to the sender. Since the receiver can deliver the packets 1 through 5 to the higher protocol stack layer, the receiver can update its receiver window 220 so that it is now expecting packets with sequence numbers 6 through 10.

In one aspect of the invention, the ACK message includes a service ID field with the service ID of the data flow on which the acknowledgement was generated, a format type field (e.g., complete bitmap, simplified bitmap, range format), a byte length field, a sequence number of the first expected frame and the starting sequence number of the receiver window and an information map field that is a map of the receive window showing the frames that are lost and the frames that have been received properly. The information map field is empty if the packets are properly received in sequence. The sender window can be updated based on the information provided in the ACK message.

Based on the acknowledgement at 238, at 240 the sender is able to update the sender window 210 by removing packets 1 through 5 so that it can now buffer packets 6 through 10. Since the packets 1 through 5 have been removed, the sender is able to receive more packets from a higher protocol stack layer and thus, at 240, the sender window 210 is illustrated buffering packets 6 through 10. At 244, packets 6 through 10 are transmitted to the receiver. Assume that the packets 6 through 10 are received correctly and thus, at 246, the receiver window 220 buffers the packets 6 through 10. Since the packets 6 through 10 were received correctly and can be delivered in order to a higher protocol stack layer, the receiver generates an acknowledgment (e.g., ACK 10) that is sent, at 248, to the sender to indicate that the sender can move its window 210.

In the flow 200, the receiver is sending acknowledgments that are employed by the sender to update its transmit buffer (e.g., sliding window), thus, the receiver is participating in synchronizing the buffers between the sender and the receiver with neither the sender nor the receiver being a master or slave. Examples of the sender participating in synchronizing the buffers between the sender and the receiver follow.

Figure 3:
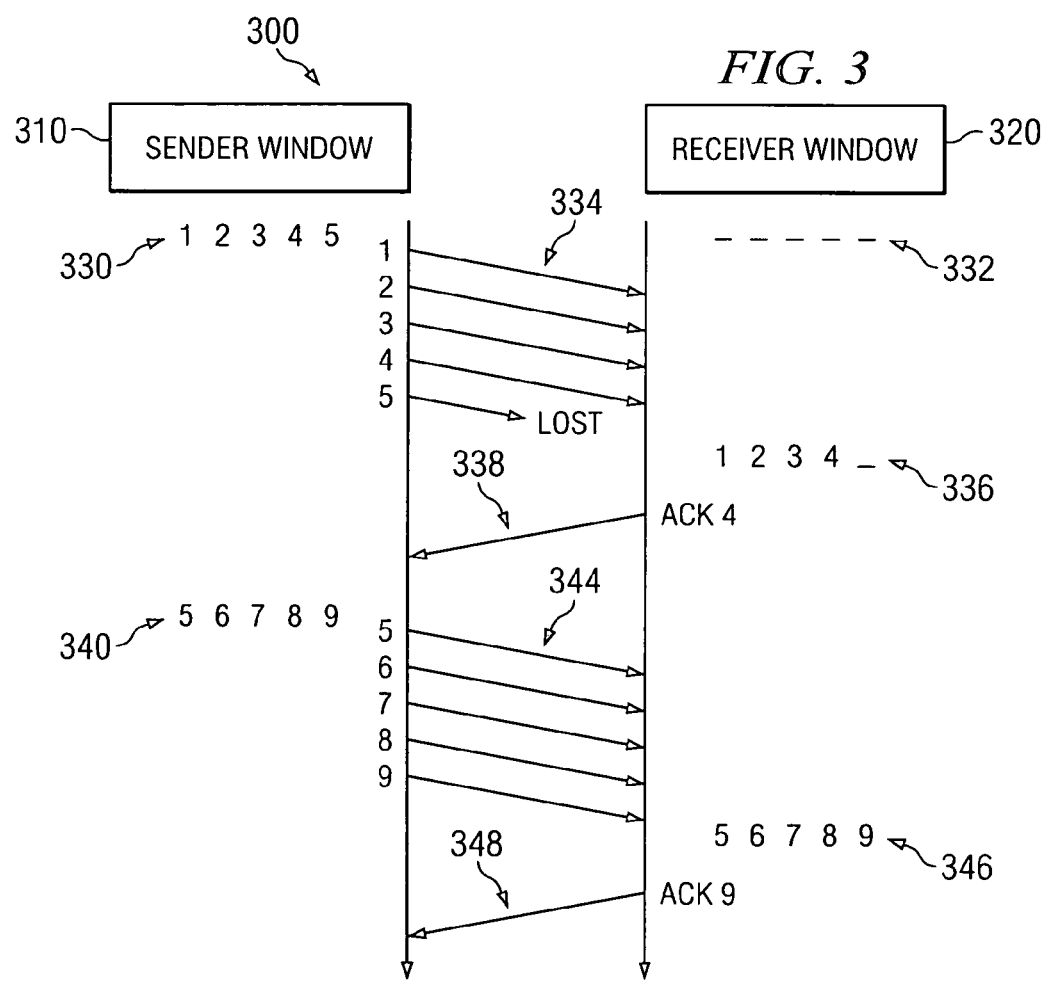
FIG. 3 illustrates a sample packet flow, in accordance with an aspect of the present invention.

The left side of FIG. 3 illustrates packets that flow through a sender window 310 while the right side of FIG. 3 illustrates packets that flow through a receiver window 320. The center of FIG. 3 illustrates a flow 300 of packets from a sender to a receiver and a flow of acknowledgements from a receiver to a sender.

In FIG. 3, assume initially that the receiver window 320 is empty, as illustrated at 332. Assume also that the sender window 310 initially receives packets 1 through 5 to transmit to the receiver. Thus, at 330, the sender window 310 holds the packets 1 through 5 and at 334 such packets are transmitted to the receiver. Assume that packets 1 through 4 are delivered correctly, but that packet 5 is lost during transmission. Thus, the receiver at 336 buffers the packets 1 through 4 and generates an acknowledgement (e.g., ACK 4) indicating that packets 1 through 4 have been received correctly and can be delivered in sequence to a higher protocol layer. The receiver can deliver the packets 1 through 4 in order to a higher protocol layer and therefore the receiver can move its receiver window 320 (e.g., sliding window) so that it is now expecting packets 5 through 9.

The sender receives the acknowledgement of 338 and thus, at 340, the sender window 310 is able to remove packets 1 through 4 and accept additional packets 6 through 9 from a higher protocol level while continuing to buffer packet 5. Therefore, at 340, the sender window 310 buffers packets 5 through 9. At 344, the sender transmits the packets 5 through 9 to the receiver. Assume that the packets 5 through 9 are correctly received at the receiver and thus, at 346, the receiver window 320 buffers packets 5 through 9. Such packets can be delivered in order to a higher protocol layer and then the receiver window 320 can be moved so that it is now expecting packets 10 through 14. At 348, the receiver sends an acknowledgement (e.g., ACK 9) to the sender indicating that the receiver has received correctly packets in order up to sequence number 9. Thus, the sender could update its buffer to accept new packets (e.g., 10 through 14). Such update could be physical (e.g., overwriting memory) and/or logical (e.g., updating pointers and/or sequence number limits).

Figure 4:
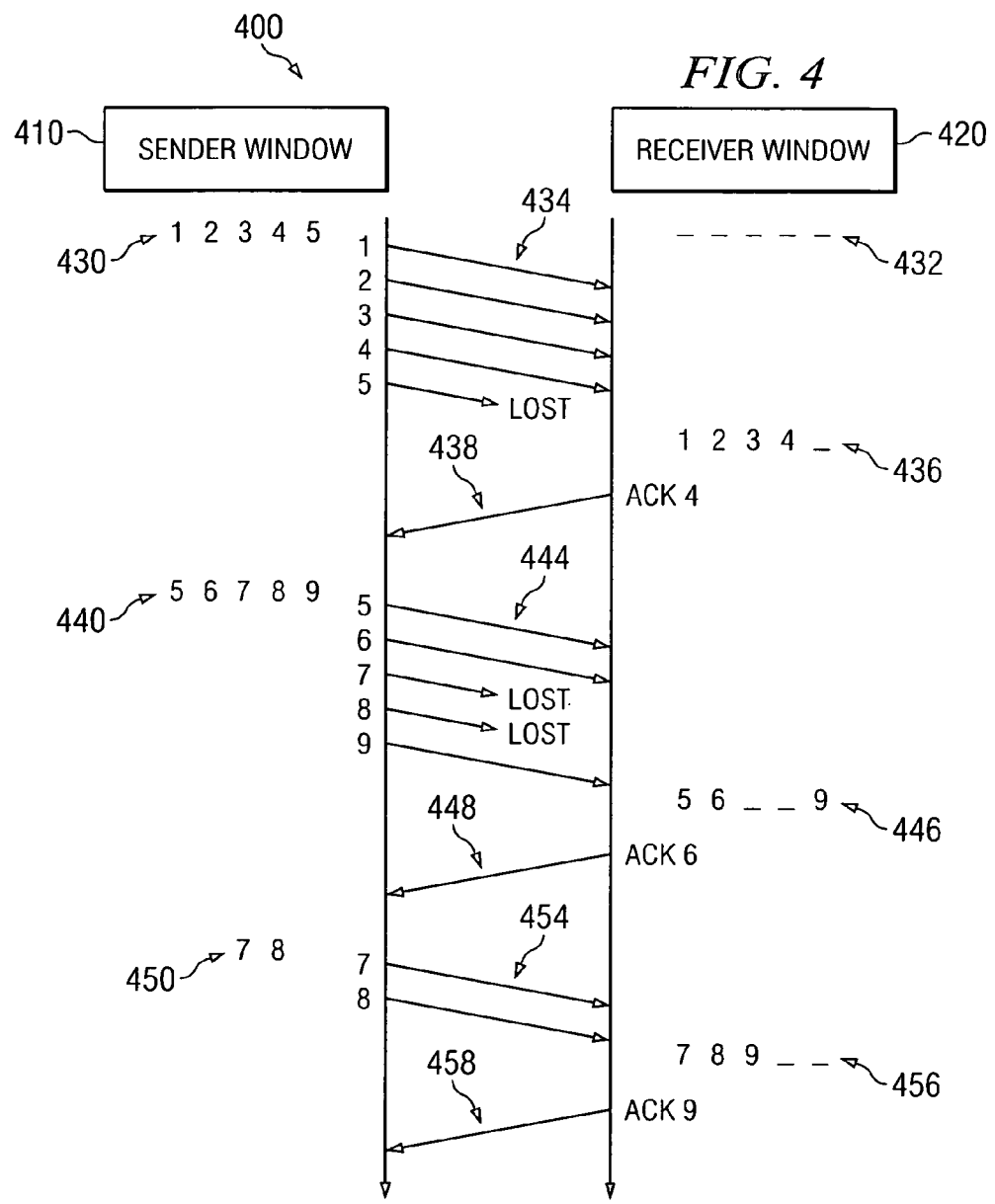
FIG. 4 illustrates a sample packet flow, in accordance with an aspect of the present invention.

The left side of FIG. 4 illustrates packets that flow through a sender window 410 while the right side of FIG. 4 illustrates packets that flow through a receiver window 420. The center of FIG. 4 illustrates a flow 400 of packets from a sender to a receiver and a flow of acknowledgements from a receiver to a sender.

In FIG. 4, assume initially that the receiver window 420 is empty, as illustrated at 432. Assume also that the sender window 410 initially receives packets 1 through 5 to transmit to the receiver. Thus, at 430, the sender window 410 holds the packets 1 through 5 and at 434 such packets are transmitted to the receiver. Assume that packets 1 through 4 are delivered correctly, but that packet 5 is lost during transmission. Thus, the receiver at 436 buffers the packets 1 through 4 and generates an acknowledgement (e.g., ACK 4) indicating that packets 1 through 4 have been received correctly and can be delivered in sequence to a higher protocol layer. The receiver can deliver the packets 1 through 4 in order to a higher protocol layer and therefore the receiver can move its receiver window 420 (e.g., sliding window) so that it is now expecting packets 5 through 9.

The sender receives the acknowledgement of 438 and thus, at 440, the sender window 410 is able to remove (e.g., physically, logically) packets 1 through 4 and accept additional packets 6 through 9 from a higher protocol level. Therefore, at 440, the sender window 410 buffers packets 5 through 9. At 444, the sender transmits the packets 5 through 9 to the receiver. Assume that packets 5, 6, and 9 are received correctly at the receiver but that packets 7 and 8 are lost during transmission. Thus, at 446, the receiver window 420 releases packets 5, 6, and buffers packet 9 and is expecting packets 7 and 8 and 10 and 11. The receiver can, therefore, send packets 5 and 6 in order to a higher protocol stack layer and can generate an acknowledgement (e.g., ACK6) indicating that packets through packet 6 have been received in order. The receiver window 420 sends the packets 5 and 6 to the higher protocol stack layer and thus advances it window so that is now expecting packets 7, 8, 10 and 11. The receive format would then have the following format: [x, x, 9, x, x].

The sender receives the acknowledgement of 438 and thus, at 440, the sender window 410 is able to remove (e.g., physically, logically) packets 1 through 4 and accept additional packets 6 through 9 from a higher protocol level. Therefore, at 440, the sender window 410 buffers packets 5 through 9. At 444, the sender transmits the packets 5 through 9 to the receiver. Assume that packets 5, 6, and 9 are received correctly at the receiver but that packets 7 and 8 are lost during transmission. Thus, at 446, the receiver window 420 releases packets 5, 6, and buffers packet 9 and is expecting packets 7 and 8 and 10 and 11. The receiver can, therefore, send packets 5 and 6 in order to a higher protocol stack layer and can generate an acknowledgement (e.g., ACK6) indicating that packets through packet 6 have been received in order. The receiver window 420 sends the packets 5 and 6 to the higher protocol stack layer and thus advances its window so that is now expecting packets 7, 8, 10 and 11. The receive format would then have the following format: [x, x, 9, x, x].

Figure 5:
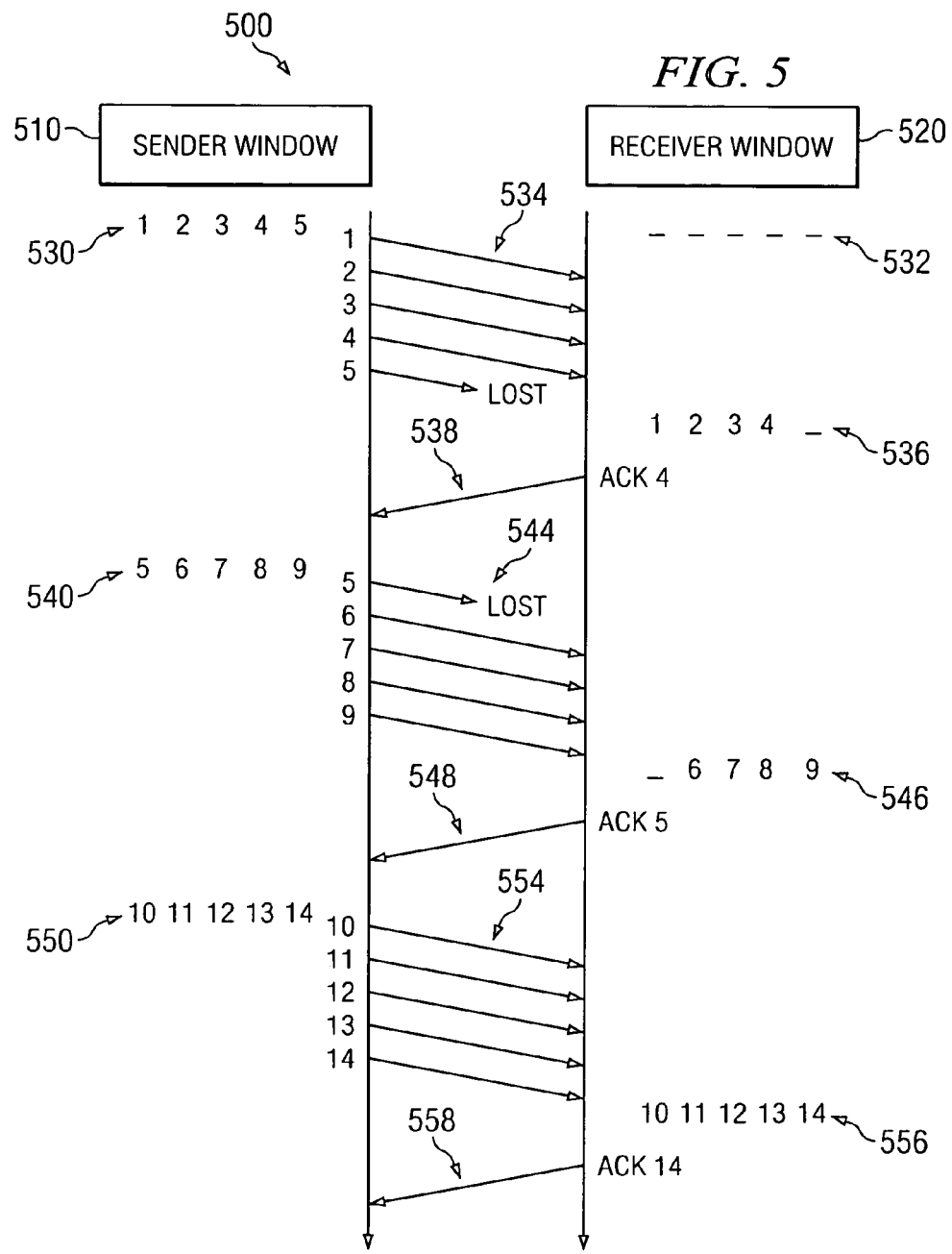
FIG. 5 illustrates a sample packet flow, in accordance with an aspect of the present invention.

The left side of FIG. 5 illustrates packets that flow through a sender window 510 while the right side of FIG. 5 illustrates packets that flow through a receiver window 520. The center of FIG. 5 illustrates a flow 500 of packets from a sender to a receiver and a flow of acknowledgements from a receiver to a sender.

In FIG. 5, assume initially that the receiver window 520 is empty, as illustrated at 532. Assume also that the sender window 510 initially receives packets 1 through 5 to transmit to the receiver. Thus, at 530, the sender window 510 holds the packets 1 through 5 and at 534 such packets are transmitted to the receiver. Assume that packets 1 through 4 are delivered correctly, but that packet 5 is lost during transmission. Thus, the receiver at 536 buffers the packets 1 through 4 and generates an acknowledgement (e.g., ACK 4) indicating that packets 1 through 4 have been received correctly and can be delivered in sequence to a higher protocol layer. The receiver can deliver the packets 1 through 4 in order to a higher protocol layer and therefore the receiver can move its receiver window 520 (e.g., sliding window) so that it is now expecting packets 5 through 9. The window can be moved physically and/or logically.

The sender receives the acknowledgement of 538 and thus, at 540, the sender window 510 is able to remove packets 1 through 4 and accept additional packets 6 through 9 from a higher protocol level. Therefore, at 540, the sender window 510 buffers packets 5 through 9. At 544, the sender transmits the packets 5 through 9 to the receiver. Assume that packets 6 through 9 are received correctly, but that packet 5 is lost again. Thus, at 546, the receiver window 520 buffers packets 6 through 9, but is still configured so that it is expecting packet 5. Even though receiver cannot deliver any more packets in order to a higher protocol layer, the receiver will still generate an ACK5 indicating it is still waiting for packet 5 unless the receiver wants to give up on packet 5 because the time that the receiver has been waiting for packet 5 exceed a predetermined configurable period of time.

The sender, after receiving the ACK 5 and/or after waiting a pre-determined, configurable period of time can reexamine its sender window 510 to determine whether changes should be made. In one example of the present invention, if the sender determines that packet 5 has been transmitted so many times that retransmission of packet 5 should not be undertaken (e.g., packet 5 has been transmitted more than a pre-determined, configurable retry limit), then the sender can adjust its sender window 510 to release packet 5 and to accept a new packet. As a result, packet 6 to 9 will be released as the result of giving up on packet 5, using the information in the ACK 5 message that the packets 6–9 has been received successfully.

In another aspect of the invention, the receive window 520 will release packets 6–9 if it determines that it has waited longer than a predetermined-configurable period of time for packet 5 and send an ACK indicating it is expecting packet 10. After receiving the ACK, the sender knows the receiver window 520 has moved the window to buffer packet 10, it will give up on packet 5, release packet 6–9 and move the window to buffer packets starting from 10. Once the sender window 510 has been adjusted, the sender window 510 can accept the new packet 10, and thus at 550, the sender window 510 buffers packets 10 through 14. Only the lost packets will be re-transmitted the packets that have been ACK will not be re-transmitted, so only 5 will be re-transmitted, and assumption made that packets 6 through 10 have received correctly.

However, packet 10 presents an exceptional circumstance for the receiver if the receiver has not released packet 5, since the receiver window 520 is not expecting packet 10. Conventionally, absent a synchronization and/or control message from a master, the receiver would likely ignore the packet 10 and continue to wait for packet 5. But the sender has already determined not to retransmit packet 5 any more. Thus, in accordance with an aspect of the present invention, the receiver can interpret the new packet 10 as a signal to move its receiver window 520 and accept packet 10. Thus, at 556, the receiver window 520 buffers packets 10 through 14, which can then be delivered in order to a higher protocol stack layer. At 558, an acknowledgment (e.g., ACK 14) can be sent to the sender indicating that packets through sequence number 14 have been received correctly, in order, and thus the sender can update its sender window 510. This is an example of the sender impacting the receiver window 520 without employing master/slave processing and/or separate synchronization messages.

The left side of FIG. 6 illustrates packets that flow through a sender window 610 while the right side of FIG. 6 illustrates packets that flow through a receiver window 620. The center of FIG. 6 illustrates a flow 600 of packets from a sender to a receiver and a flow of acknowledgements from a receiver to a sender.

In FIG. 6, assume that the receiver window 620 has been involved in previous processing and thus at 632 is buffering packets 2, 3, and 5 and is expecting packets 1 and 4. Further assume that at 630, the sender window 610 is buffering packets 1 through 5. At 630, the sender decides that packet 1 has reached its retry limit, and thus after transmitting packet 1 one last time at 634, releases packet 1 from the sender window 610. Furthermore, the sender determines that packets 2 and 3 have been received correctly by the receiver, and thus the sender window 610 can be updated to permit accepting packets 6, 7, and 8. Thus, at 634, packets 1, 4, 6, 7, and 8 are transmitted to the receiver. Assume that packets 1, 6, and 7 are lost. Thus, at 636, the receiver window 620 is buffering packets 2 through 5, which can be delivered in order to a higher protocol layer. But the receiver 620 also received packet 8, which was not being expected by the receiver. Thus, the receiver can determine that packet 1 is not going to be retransmitted, and that the receiver window should be updated with packet 8, which leaves packet 3 at the lower limit if the maximum size of the receiver window 620 is five. Once packet 4 is received, packets 3, 4 and 5 will be released, since any in sequence received packets will be released up to the next expected packet. Alternatively, the receiver could determine that since packets 2 through 5 were delivered in order to the higher protocol layer, that the receiver window 620 could be reconfigured to expect packets 6 through 10.

At 638, the receiver generates an acknowledgment (e.g., ACK 5) indicating that packets in sequence up to number 5 have received correctly. Thus, the sender can adjust its sender window 610 to release packets through packet 5 and thus accept packets 6 through 10. At 644, packets 6 and 7 are retransmitted to the receiver. Packets 6 and 7 are buffered, and thus at 646, the receiver window 620 is buffering packets 6 through 8. In another example of the present invention, at 646, the receiver window 620 would be buffering packets 6 through 8. Packets 6–8 will be released immediately since they are all in sequence now. At 648, the receiver can generate an acknowledgment (e.g., ACK 8)

indicating that packets with sequence numbers through packet 8 have been received correctly, can deliver the packets in order to a higher protocol layer, and flush its receiver window 620. Similarly, upon receiving the acknowledgement at 648, the sender can flush its sender window 610. This is an example of both the sender and the receiver advancing their windows to keep the windows synchronized with neither the sender nor the receiver acting as a master or slave and without the need for distinct synchronization messages.

Turning now to FIG. 7, a state diagram 700 illustrates state transitions for a packet on the sending side of a packet communication system. The state transitions begin at 710, when a packet is received from a higher protocol stack layer. Once the packet has been buffered on the sender, the sender prepares the packet for transmission. When a packet is handed down from upper layer and stored in the TX window, it is labeled as pending. The packet remains in the pending state until its transmission opportunity becomes available. In one example of the present invention, the sender Media Access Control (MAC) layer sends the packet to a sender physical (PHY) layer at which time the packet state transitions to outstanding at 730.

From state 730, there are different possibilities for state transitions. One possibility involves the sender receiving a positive acknowledgement for the transmitted packet. Receiving the acknowledgment triggers the state transition to released at 750, and thus the packet can be removed from the sender buffer and the sender data structure (e.g., sliding window) can be updated to reflect the change. Another possibility involves the sender receiving a negative acknowledgment for the transmitted packet. Receiving the negative acknowledgment triggers the state transition to lost at 740. When a packet has been transitioned to lost, there are two possibilities. Either the sender can determine that it will attempt to retransmit the packet, which triggers a state transition back to pending at 720, or the sender can determine that it will not attempt to retransmit the packet (e.g., pre-determined, configurable retry limit exceeded) in which case the packet will be transitioned to released at 750. Thus, a packet is released from the transmit window when the sender has either received a positive acknowledgment or has exhausted its retransmission budget. Alternatively, and/or additionally, a packet can be transitioned from the outstanding state at 730 to the lost state at 740 not because a negative acknowledgement was received but because a pre-determined, configurable acknowledgment period has expired without receiving a positive acknowledgment.

Figure 9:
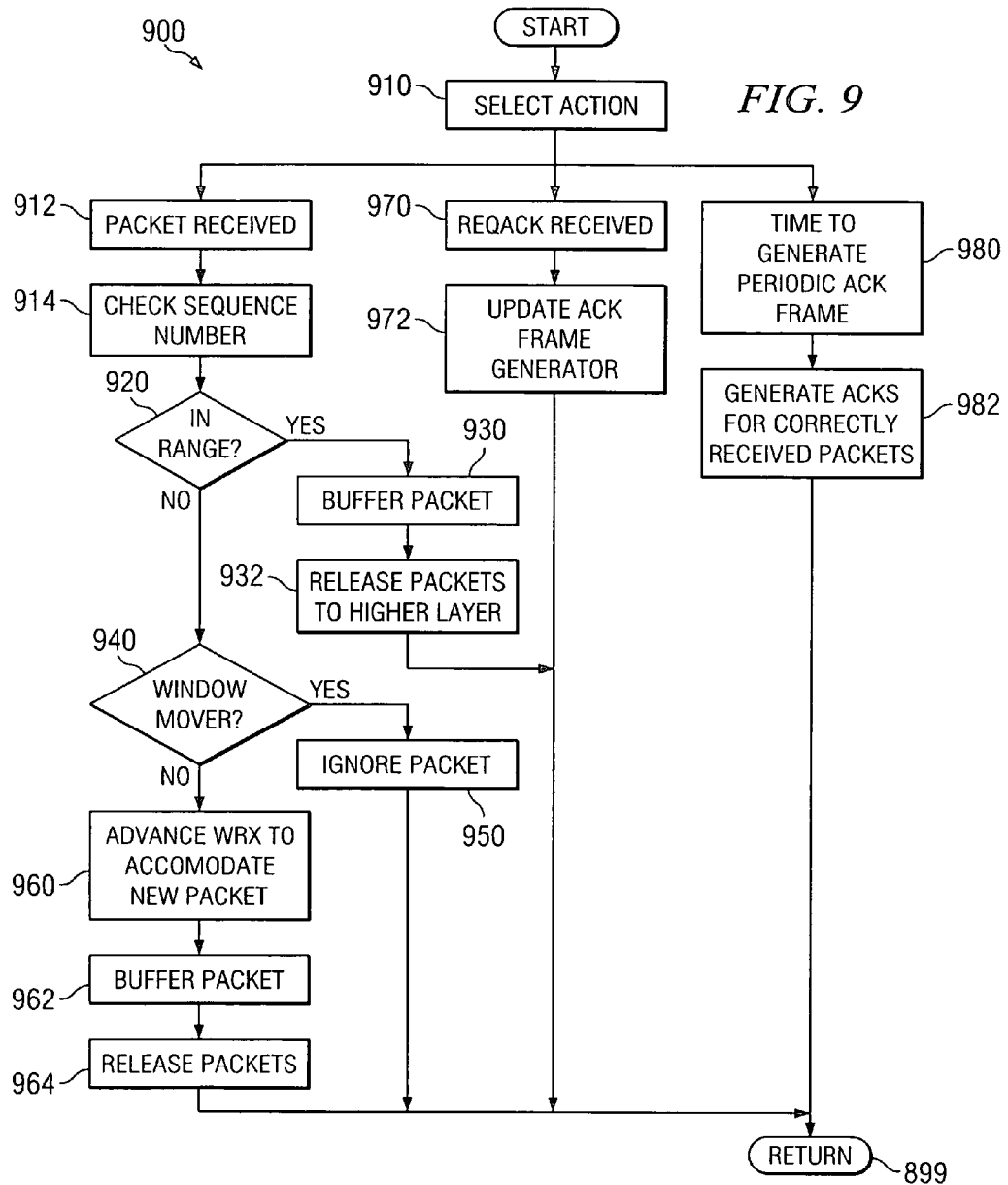
FIG. 9 is a flow chart of a packet receipt algorithm, in accordance with an aspect of the present invention.

In view of the foregoing structural and functional features described above, a methodology in accordance with various aspects of the present invention will be better appreciated with reference to FIGS. 8–9. While, for purposes of simplicity of explanation, the methodologies of FIGS. 8–9 is shown and described as executing serially, it is to be understood and appreciated that the present invention is not limited by the illustrated order, as some aspects could, in accordance with the present invention, occur in different orders and/or concurrently with other aspects from that shown and described herein. Moreover, not all illustrated features may be required to implement a methodology in accordance with an aspect the present invention.

The invention can be described in the general context of computer-executable instructions, such as program modules, executed by one or more components. Generally, program modules include routines, programs, objects, data structures, etc. that perform particular tasks or implement particular data types. Typically the functionality of the program modules can be combined or distributed as desired in various embodiments. Thus, computer executable instructions operable to perform the methods described herein can be stored on computer readable media including, but not limited to, disks, memories, and carrier waves. Similarly, computer executable components of the systems described herein can be stored on computer readable media including, but not limited to, disks, memories, and carrier waves.

FIG. 8 illustrates a method 800 for transmitting a packet that facilitates synchronizing a sender sliding window with a receiver sliding window. At 810, the method 800 selects between three possible actions triggered by events that happen at a sender. While three actions are illustrated, it is to be appreciated that in other examples of the present invention the method 800 can select between a greater number of actions.

One event that triggers an action at 820 is receiving a packet from a higher layer in a protocol stack. When a packet is received, a determination is made at 822 concerning whether the window for buffering packets (WTX) to transmit is full. If the window is full, then at 824 various recovery operations can be performed. For example, the packet can be dropped, the packet can be placed in an overflow buffer and the like. After such recovery operations, the method returns at 899. In one aspect of the invention, when WTX is full, the upper layer packets will not pass more packets to the WTX, unless the WTX releases some packets or the upper layer caused the window to slide. If the window is not full, then at 826 the packet is stored in the WTX, at 828 a state associated with the packet is updated and the method returns at 899.

Another event that triggers an action at 830 is sending the packet from the WTX to for transmission to the receiver. For example, a MAC layer can pass the packet to a PHY layer for physical transmission. When the packet is passed to the lower layer, the method 800, at 832, estimates the time TRECEIVE at which the packet is likely to be received at the receiver and stores such time locally. This time can be employed to determine whether an acknowledgment to the packet has been received within a pre-determined, configurable period of time, which facilitates retransmission processing. At 834, the state associated with the packet is updated and the method returns at 899.

Another event that triggers an action at 840 is receiving an acknowledgment and/or an acknowledgment frame. At 842, data associated with the acknowledgment and/or acknowledgment frame can be read. Such data includes, but is not limited to, a time at which the acknowledgment and/or acknowledgment frame was generated, one or more sequence numbers associated with the acknowledgment and/or acknowledgment frame, and the like. At 844, based, at least in part, on the information retrieved at 842, the method 800 updates the sender window. If an acknowledgment for an outstanding packet is received, the packet can be removed from a transmit buffer and data structures associated with the packet can be updated to reflect that the packet has been released. By way of further illustration, if no acknowledgment for an outstanding packet has been received within a period of time established for receiving such an acknowledgment and if the packet for which no acknowledgment has been received has reached a retry limit, then the packet can be removed from the transmit buffer and data structures associated with the packet can be updated to reflect that the packet has been released.

At 846, a determination is made concerning whether there are any packets to retransmit. If the determination is NO, then method 800 returns at 899. But if the determination at

846 is YES, then at 848 such packets can be retransmitted (e.g., passed to PHY layer, TRECEIVE computed and stored, packet state updated).

The following pseudocode further illustrates one example of method 800.

| | |
|---|---|
| NlastAck | Sequence number of last Ack frame received |
| Sactive | {SID$_1$, SID$_2$, SID$_3$, . . . } including SIDs that have transmitted data frames since last ACK |
| WTX | {Nfirst, . . . , Nlast}, TX window (Ni is sequence number and/or corresponding packet) |
| Wsize | TX window size |
| Nfirst | Sequence number of first unacknowledged packet in TX window |
| Nlast | Sequence number of last packet in TX window, last packet sent |
| TAckSID | Expected ACK time for latest packet transmission |
| BreqAck | Indicate sending explicit request for acknowledgment (REQ_ACK) |
| Cretry | Retry Counter |
| Treceive | Estimated time when packet should be received |
| Status | Packet transmission state |

```
// called when sender receives a new data packet from a higher protocol stack layer
Proc process_incoming_packet(new_pkt)
{
    if Nlast − Nfirst < Wsize − 1 then // Tx window is not full
        WTX = WTX + new_pkt // unqueue the new packet in Tx window
        New_pkt.sn = Nlast + 1 // set sequence number of the packet
        Nlast = new_pkt.sn // update latest sequence number in Tx window
        Initialize new_pkt.Cretry // set initial retry count for the packet
        Transmit new_pkt
        New_pkt.status = PENDING // update packet state
    Else
        Perform recovery // e.g., drop packet, overflow buffer
    Endif
}
// called when a data packet is sent to TX PHY layer
Proc on_packet_sent (outgoing_pkt)
{
    outgoing_pkt.status = OUTSTANDING // update packet state
    outgoing_pkt.Treceive = estimated arrival time // store Treceive locally
    TackSID = outgoing_pkt.Treceive // record most recent Treceive in global
    Sactive = Sactive + {SID} // update active SIDs
}
// called when sender receives and Ack frame from the receiver
Proc process_ack_frame (ack_frame)
{
    for each SID that is a member of ack_frame
        BreqAck = FALSE // initially don't send any request ACK
        Process_ack_message(ack_frame.SID.ack_message) // parse ACK frame messages
        Retransmit(SID) // retransmit packets belong to SID if needed
    End for
    For each SID that is not a member of ack_Frame and IS a member of Sactive
        If ack_frame.ack_time > SID.TackSID & SID has no packet pending then
            If ack_frame.ack_sn <> Nlastack + 1 OR BreqAck == TRUE then
                Send REQ_ACK message
                BreqAck = TRUE
            Else
                For each OUTSTANDING pkt
                    Pkt.status = LOST
                End for
                Retransmit (SID)
            End if
        End if
    End for
    NlastAck = ack_frame.ack_sn
}
proc_process ack_message(ack_message)
{
    if ack_message.sn > Nfirst then // check Rx window status
        WTX = WTX − {Nfirst, . . . , Nack_message.sn − 1 } // sync up with Rx window movement
        Nfirst = ack_message.sn
    end if
    for each pkt that is a member of ack_message.ReceivedPktsList
        pkt.status = RELEASED // positively acknowledged
    end for
```

```
        for each OUTSTANDING pkt
            if pkt.Treceive <= ack_frame.ack_time then
                pkt_status = LOST // referred from using time stamps
            end if
        end for
}
proc retransmit(SID)
{
    for each LOST pkt
        ifpkt.Cretry > 0 then
            transmit pkt
            pkt.status = PENDING
            pkt.Cretry = pkt.Cretry - 1
        else
            pkt.status = RELEASED // give up on the packet
        end if
    end for
    while Nfirst.status == RELEASED
        WTX = WTX - {Nfirst} // slide the window accordingly
        Nfirst = Nfirst + 1
    end while
}
```

Turning now to FIG. 9, a method 900 for receiving a packet that facilitates synchronizing a receiver sliding window and a sender sliding window is flow charted. At 910, the method 900 selects between three possible actions triggered by events that happen at a sender. While three actions are illustrated, it is to be appreciated that in other examples of the present invention the method 900 can select between a greater number of actions.

One event that triggers an action at 912 is receiving a packet. When a packet is received, at 914, information associated with the packet can be retrieved from the packet. For example, data including, but not limited to a sequence number can be retrieved. At 920, a determination is made concerning whether the sequence number associated with the packet is within the range of sequence numbers that the receiver was expecting. If the determination at 920 is YES, then at 930 the packet is buffered and at 932, packets that can be delivered in order can be delivered to a higher protocol stack layer. At 999, the method 900 returns. But if the determination at 920 is NO, then a subsequent determination is made to determine whether to ignore the packet or to interpret the packet as a packet that signals that the receiver should advance its sliding window. Thus, at 940, a determination is made concerning whether the packet is a window mover. If the determination at 940 is NO, then at 950 the packet is ignored and the method returns at 999. But if the determination at 940 is YES, then the receiver window (WRX) is reconfigured to accommodate the newly received packet with the heretofore out of window range sequence number. Such reconfiguration can include, but is not limited to, moving an upper limit of sequence numbers that the receiver is expecting, moving a lower limit of sequence numbers that the receiver is expecting and delivering packets to a higher protocol stack layer. At 962, the packet is buffered and at 964 packets that may have been moved out of the range of expected packets can be delivered to a higher protocol stack layer. Thus, some packets may be delivered out of order. At 999, the method returns.

Another event that triggers an action at 970 is receiving a request for an acknowledgment (REQACK). For example, the sender may have transmitted a packet and determined that no acknowledgment for the packet had been received within a desired time period. Thus, rather than automatically retransmitting the packet, the sender may have sent a REQACK to the receiver asking for an acknowledgment to the packet. At 972, the receiver can update an acknowledgement and/or acknowledgment frame generator so that such generator will transmit the requested acknowledgment if appropriate. Alternatively, and/or additionally, the generator may produce a negative acknowledgment (e.g., NACK) indicating that the packet associated with the REQACK was not received correctly. The method then returns at 999.

Another event that triggers an action at 980 is determining that the time to generate a periodic acknowledgment and/or acknowledgment frame has arrived. A receiver on which the method 900 is running can be programmed to periodically generate acknowledgments, and/or to group such acknowledgements into an acknowledgment frame that can be sent to the sender. Such acknowledgements, as described in association with FIG. 8, can be employed by the sender to move its sliding window. The method then returns at 999.

The following pseudocode further illustrates one example of method 900.

| | |
|---|---|
| NlastAck | Sequence number of last Ack frame |
| Sactive | {SID$_1$, SID$_2$, SID$_3$, . . . } including SIDs that have changes in RX window |
| WRX | {Ni . . . }, RX window, where Ni is received and Ni is a member of {Nfirst, Nfirst + Wsize - 1} |
| Wsize | RX window size |
| Nfirst | Sequence number of first expected packet in RX window |
| Nlast | Sequence number of last received packet in RX window |
| BreqAck | Indicate reception of explicit request for acknowledgment (REQ_ACK) |

```
// called when receiver receives a new packet from sender
proc process_received_packet(new_pkt)
{
    Sactive = Sactive + {SID} // add active SID into the active SID set
    If Nfirst <= new_pkt.sn < Nfirst + Wsize then // if received packet fits in Rx
window
        WRX = WRX +{ new_pkt} // store the packet in Rx window
        If Nlast < new_pkt.sn then // check if window sliding is needed
            Nlast = new_pkt.sn // sync Rx window with Tx window
        End if
    Else if Nlast - Wsize < new_pkt.sn < Nfirst then // a redundant transmit
        NOP
    Else // out of window sequence packet is received
        Nlast = new_pkt.sn // slide the window to be in sync with Tx window
        Release pkt members of {Nfirst, . . . , Nlast - Wsize} to upper layer
        WRX = WRX - {Nfirst . . . , Nlast - Wsize}
        WRX = WRX + {new_pkt}
        NFirst = NLast - Wsize + 1
    End if
    While Nfirst a member of WRX
        Release packet Nfirst to upper layer
        WRX = WRX - {Nfirst}
        Nfirst = Nfirst + 1
    End while
}
// called when receiver receives a REQ_ACK
proc process_req_ack()
{
    Sactive = Sactive + {SID} // add new SID into active SID set
}
// called when it is time to generate an ACK frame
proc generate_ack_frame(ack_frame)
{
    NlastAck = NlastAck + 1 // update ACK sequence number
    Ack_frame.ack_sn = NlastAck // store ACK sequence number in the ACK frame
    Ack_frame.ack_time = global time // record ACK time
    For each SID a member of Sactive
        Make an ack_message // build ACK messages
        Ack_frame = ack_frame + {ack_message} // build ACK frame
    End for
    Transmit ack_frame
    Sactive = NULL // clear active SID sets
}
```

FIG. 10 illustrates an environment 1000 in which the present invention can be employed. The environment 1000 includes a backbone network 1010 from which packets can be generated that are intended to be communicated to one or more customer premises equipments (CPE) 1060. The backbone network 1010 interacts with a WATS indoor unit (IDU) 1020 via a WATS interface 1015. The WATS IDU 1020 in turn interacts with a WATS outdoor unit (ODU) and/or antenna 1030 via a WATS IDU/ODU interface 1025. Signals are transmitted in an over the air signal 1035 from the WATS ODU 1030 and are received by a WM ODU and/or antenna 1040. The WM ODU and/or antenna 1040 then interacts with a WM IDU 1050 via a WM/IDU interface 1045. The WM IDU 1050 then interacts with one or more CPEs 1060 delivering the packets that were generated at the backbone network 1010, for example. While data flow from the backbone network 1010 to the CPEs 1060 is illustrated in FIG. 10, it is to be appreciated that packets, ACKs and other messages and/or signals can flow from the CPEs 1060 to the backbone network 1010.

What has been described above are examples of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications and variations that fall within the spirit and scope of the appended claims.

What is claimed is:

1. A method of synchronizing a receive packet buffer window in a receiver with a transmit packet buffer window of a transmitter in a wireless data communication system comprising:
    receiving a first plurality of data packets from the transmitter in the receive packet buffer window, wherein each one of the first plurality of data packets is marked with a sequence number and the receive packet buffer window has a lower limit indicating a minimum sequence number of data packets and an upper limit indicating a maximum sequence number of data packets that can be stored in the receive packet buffer window;
    sending an acknowledgement to the transmitter acknowledging receipt of the first plurality of data packets, wherein the acknowledgement includes an indication of sequence numbers of data packets that were not received by the receiver in the first plurality of data packets; and
    receiving a second plurality of data packets from the transmitter in the receive packet buffer window;

if the second plurality of data packets does not include packets that were not received by the receiver in the first plurality of data packets, then updating the lower and upper limits of the receive packet buffer window corresponding to the minimum and maximum sequence numbers respectively of data packets included in the second plurality of data packets.

2. A method according to claim 1, further comprising:
storing the second plurality of data packets in the receive packet buffer window with update lower and upper limits.

3. A method according to claim 1, wherein the minimum and maximum sequence numbers of data packets included in the second plurality of data packets correspond to a lower limit and an upper limit respectively of the transmit packet buffer window of the transmitter.

4. A communication device comprising:
means for receiving a first plurality of data packets from a transmitter in a receive packet buffer window of a receiver, wherein each one of the first plurality of data packets is marked with a sequence number and the receive packet buffer window has a lower limit indicating a minimum sequence number of data packets and an upper limit indicating a maximum sequence number of data packets that can be stored buffer window;

means for sending an acknowledgement to the transmitter acknowledgement to the transmitter acknowledging receipt of the first plurality of data packets, wherein the acknowledgement includes an indication of sequence numbers of data packets that were not received by the receiver in the first plurality of data packets;

means for receiving a second plurality of data packets from the receive packet buffer window corresponding to the minimum and maximum sequence numbers of data packets included in the second plurality of data packets if the second plurality of data packets does not include packets that were not received by the receiver in the first plurality of data packets.

5. A communication device according to claim 4, further comprising:
means for storing the second plurality of data packets in the receive packet buffer window with update lower and upper limits.

6. A method of synchronizing a receive packet buffer window in a receiver with a transmit packet buffer window of a transmitter in a data communication system comprising:
receiving a first plurality of data packets from the transmitter in the receive packet buffer window of the receiver;

sending an acknowledgement to the transmitter from the receiver, the acknowledgement acknowledging receipt of one or more of the first plurality of data packets and indicating that one or more of the first plurality of data packets were not received by the receiver;

receiving a second plurality of data packets from the transmitter in the receive packet buffer window of the receiver; and updating a lower limit and an upper limit of the receive packet buffer window corresponding to a minimum and a maximum sequence numbers respectively of data packets included in the second plurality of data packets.

7. A method according to claim 6, wherein each one of the first plurality of data packets is marked with a sequence number and the lower limit of the receive packet buffer window indicates the minimum sequence number of data packets and the upper limit of the receive packet buffer window indicates the maximum sequence number of data packets that can be stored in the receive packet buffer window.

8. A method according to claim 6, is updated if the second plurality of data packets does not include packets that were not received by the receiver in the first plurality of data packets.

9. A communication device comprising:
means for receiving a first plurality of data packets from a transmitter in a receive packet buffer window;

means for sending an acknowledgement to the transmitter, the acknowledgement acknowledging receipt of one or more of the first plurality of data packets and indicating that one or more of the first plurality of data packets were not received by the communication device;

means for receiving a second plurality of data packets from the transmitter in the receive packet buffer window; and means for updating a lower limit and an upper limit of the receive packet buffer window corresponding to a minimum sequence number and a maximum sequence number respectively of data packets included in the second plurality of data packets.

10. A communication device according to claim 9, wherein each one of the first plurality of data packets is marked with a sequence number and the lower limit of the receive packet buffer window indicates the minimum sequence number of data packets and the upper limit of the receive packet buffer window indicates the maximum sequence number of data packets that can be stored in the receive packet buffer window.

11. A method of synchronizing a receive packet buffer window in a receiver with a transmit packet buffer window of a transmitter in a data communication system comprising:
receiving a first plurality of data packets from the transmitter in the receive packet buffer window of the receiver;

sending an acknowledgement to the transmitter acknowledging receipt of one or more of the first plurality of data packets;

receiving a second plurality of data packets from the transmitter in the receive packet buffer window of the receiver; and updating a lower limit and an upper limit of the receive packet buffer window corresponding to a minimum sequence number and a maximum sequence number respectively of data packets included in the second plurality of data packets received from the transmitter if the second plurality of data packets does not include packets that were not received in the first plurality of data packets.

12. A communication system comprising:
a transmitter; and a receiver, wherein the receiver is configured to receive a first plurality of data packets from the transmitter in a receive packet buffer window;

send an acknowledgement to the transmitter, the acknowledgment acknowledging receipt of one or more of the first plurality of data packets and indicating that one or more of the first plurality of data packets were not received by the receiver;

receive a second plurality of data packets from the transmitter in the receive packet buffer window; and update a lower limit and an upper limit of the receive packet buffer window corresponding to a minimum sequence number and a maximum sequence number respectively of data packets included in the second plurality of data packets.

13. A communication system according to claim 12, wherein the size of the receive packet buffer window is negotiated during service establishment between the transmitter and the receiver.

14. A communication system according to claim 12, wherein the transmitter and the receiver are components in a wireless packet communication system.

* * * * *